May 24, 1927.
F. M. ROGERS ET AL
TREATING SLUDGE ACID
Filed Aug. 14. 1924
1,630,074
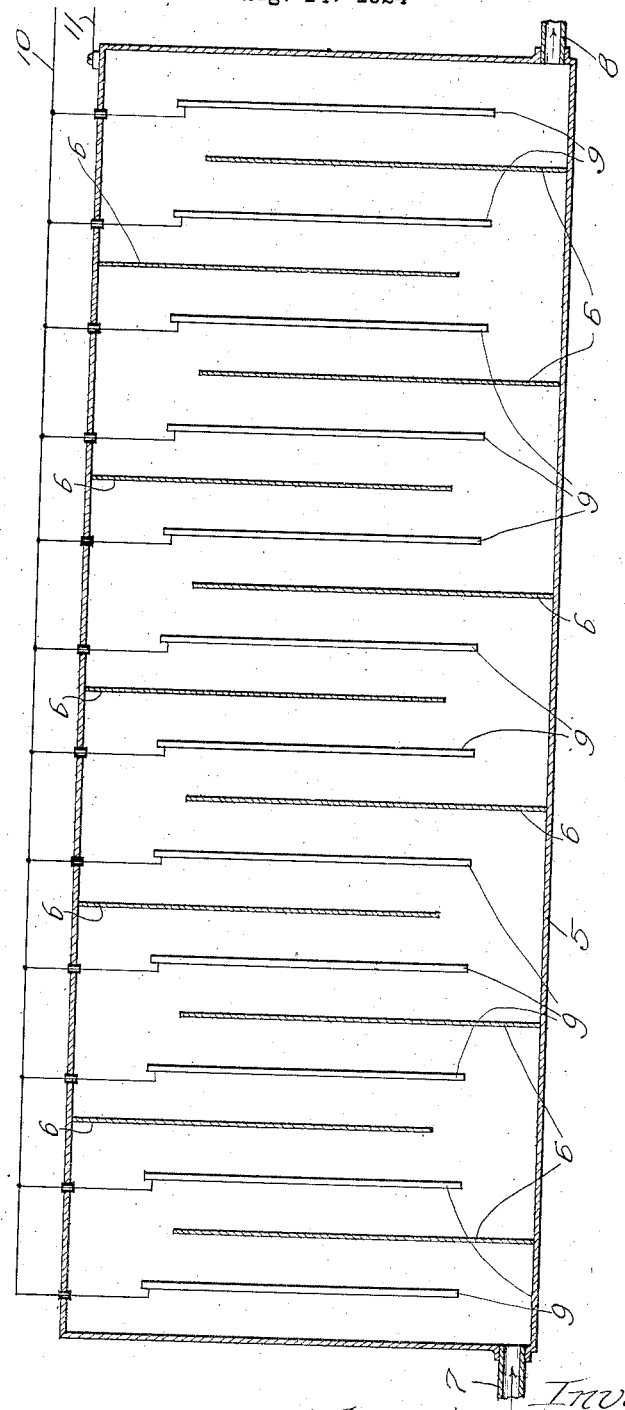
Inventors:
Francis M. Rogers,
Frank V. Grimm,
Gerald L. Wendt,
By Dyrenforth, Lee, Chritton & Wiles, Attys Patented May 24, 1927.

1,630,074

UNITED STATES PATENT OFFICE.

FRANCIS M. ROGERS AND FRANK V. GRIMM, OF WHITING, INDIANA, AND GERALD L. WENDT, OF CHICAGO, ILLINOIS, ASSIGNORS TO STANDARD OIL COMPANY, OF WHITING, INDIANA, A CORPORATION OF INDIANA.

TREATING SLUDGE ACID.

Application filed August 14, 1924. Serial No. 731,995.

The present application relates to improvements in the concentration of sludge acids and similar products and will be fully understood from the following description, illustrated by the accompanying drawing, in which apparatus for carrying the invention into effect is diagrammatically shown in plan.

Sludge acid, which in ordinary refinery practice may be derived from the sulfuric acid treatment of a single type of oil or may be a mixed product from the acid treatment of several types of oil, contains substantial proportions of organic matter which remain in the acid even after dilution by water or by weaker sludge acids to the lowest concentration which may be economically concentrated for reuse. In ordinary practice the sludge acid may be diluted, for example to 35° to 42° Baumé, an average sludge acid, ready for reconcentration, being 37 to 38° Baumé. The sludge acid, even when so diluted, contains sufficient organic matter to give a carbon content of 0.8 to 1% or higher. The organic matter thus present in the sludge acid gives rise to a considerable loss of acid during concentration as well as introducing difficulties in operation, particularly when pan-concentration methods are employed.

In accordance with the present invention, the organic matter present in the sludge acid is materially reduced or may be even substantially eliminated by subjecting the acid, prior to concentration, to electrolysis by any suitable means. In the drawing, means are shown diagrammatically in plan whereby the operation may be carried out continuously. In the figure the numeral 5 represents a vertical electrolyzing chamber, which may suitably be constructed of lead or bronze (or, in large scale operation, may be lead-lined) and provided with vertical baffles 6 extending alternately from opposite sides of the receptacle partly across it. The sludge acid to be treated enters by means of the inlet pipe 7 and makes its exit at the opposite end of the receptacle through the outlet pipe 8. In passing through the electrolyzing receptacle, it is forced by the baffles 6 to travel an extended route. At suitable distances from the baffles 6 and from the walls of the receptacle 5, the electrodes 9 are supported within the electrolyzing chamber. The electrodes 9 are connected to a common conductor 10 leading to one pole of a suitable source of current, and the body of the receptacle 5 with which the baffles 6 are in conductive contact, is connected by conductor 11 with the opposite pole of a current source. It is to be clearly understood, of course, that any desired form of electrolyzing apparatus, either batch or continuous, may be employed and that the form illustrated is not intended to limit the character of the invention herein described and claimed.

By electrolysis of the sludge acid, the organic matter present is largely or completely removed, according to the extent to which the electrolysis is conducted. The action appears to consist largely in oxidation, and to some extent, in a coagulation of the organic matter, which is carried to the surface of the acid by the rising gas bubbles and forms a dark colored scum thereupon. In general it is sufficient to carry the electrolysis to a point such that the carbon content of the acid does not exceed 0.4% although, if desired, by longer continued action, the organic matter can be reduced to a carbon content of 0.2% or lower.

In carrying out the invention, the sludge acid to be treated, and derived from various refinery sources, is diluted to 35 to 45° Baumé by the addition of water or of weaker sludge acids. The removal of the organic matter by the electrolytic process is found to be accelerated by moderately heating the sludge acid before treatment, although such heating is not essential. It is preferred, however, to heat the sludge acid to a temperature of at least 100° F., and preferably to about 150° F. A current density of one and one-half to five amperes per square decimeter has been found suitable, from 3 to 3.5 amperes being preferred. The electrolysis of the sludge acid is carried to a sufficient extent to bring the organic matter present to below 0.4% carbon, as in general a further reduction is uneconomical. If desired, however, the electrolysis may be continued until the carbon content of the acid is reduced to 0.2% or lower.

We claim:

1. The method of removing organic matter from refinery sludge acids which comprises passing an electric current therethrough to form elementary oxygen and hydrogen by dissociation, thereby effecting oxidation of organic matter and causing the same to be raised to the surface of the treated acid by the action of the released gases, and separating the organic matter.

2. The method of removing organic matter from refinery sludge acids which comprises heating such acid to above 100° F., passing an electric current therethrough to form elementary oxygen and hydrogen, thereby effecting oxidation of organic matter and causing the same to be raised to the surface of the treated acid by the action of the released gases.

3. The method of removing organic matter from refinery sludge acid comprising diluting such acid to 35 to 45° Baumé, and subjecting the diluted acid to electrolysis with a current density of 1.5 to 5 amperes per square decimeter.

4. The method of removing organic matter from refinery sludge acid which comprises diluting such acid to 35 to 45° Baumé, heating the diluted acid to about 150° F. and subjecting it to electrolysis with a current density of 3 to 3.5 amperes per square decimeter and continuing the electrolysis until the carbon content of the acid is reduced to below 0.4% carbon.

5. The method of treating refinery sludge acid which comprises bringing such acid to a specific gravity of 35 to 45° Baumé, preheating it to above 100° F., then subjecting it to electrolysis to a reduction of the carbon content to less than 0.4% and subsequently concentrating the treated sludge acid.

FRANCIS M. ROGERS.
FRANK V. GRIMM.
GERALD L. WENDT.